United States Patent [19]
Trojer et al.

[11] 3,881,945
[45] May 6, 1975

[54] GLASS FIBER OF HIGH MODULUS OF ELASTICITY AND PROCESS FOR MANUFACTURING IT

[75] Inventors: Felix J. Trojer; Grahame P. O'Connor, both of Grand-Lancy/Geneva; Helmut Tannenberger, Geneva, all of Switzerland

[73] Assignee: Battelle Memorial Institute

[22] Filed: Dec. 3, 1973

[21] Appl. No.: 420,883

[30] Foreign Application Priority Data
Dec. 4, 1972 Switzerland............... 17638/72

[52] U.S. Cl. .................. 106/50; 65/2; 65/12; 65/33; 106/39.6
[51] Int. Cl. .... C03b 37/02; C03c 3/22; C03b 29/00
[58] Field of Search ............... 65/2, 12, 30, 33; 106/39.6, 50

[56] References Cited
UNITED STATES PATENTS

| | | |
|---|---|---|
| 2,968,622 | 1/1961 | Whitehurst.................. 65/33 X |
| 3,385,685 | 5/1968 | Zanaboni...................... 65/12 |
| 3,589,878 | 6/1971 | Achener....................... 65/33 X |
| 3,639,113 | 2/1972 | Aslanova et al............. 65/33 X |
| 3,799,836 | 3/1974 | Rogers et al................. 65/33 X |

Primary Examiner—Robert L. Lindsay, Jr.
Attorney, Agent, or Firm—Robert E. Burns; Emmanuel J. Lobato; Bruce L. Adams

[57] ABSTRACT

Glass fiber of high modulus of elasticity and tensile strength, belonging to the class of materials known as "ceramic glass." It is formed of a vitreous matrix containing a plurality of inclusions, at least a part of which is in a crystalline state dispersed in the matrix. This fiber is obtained by a process which consists in forming a mixture of inorganic compounds corresponding to the composition of a glass which is decomposable into two vitreous phases. This mixture is melted and homogenized. A fiber is drawn from the homogeneous mass thus obtained, and this fiber is subjected to a heat treatment which makes it possible to form vitreous inclusions therein and then causing the growth of a crystalline phase in these inclusions. This fiber can be used as reinforcement element for various materials or articles, for instance parts of synthetic organic resins.

2 Claims, 1 Drawing Figure

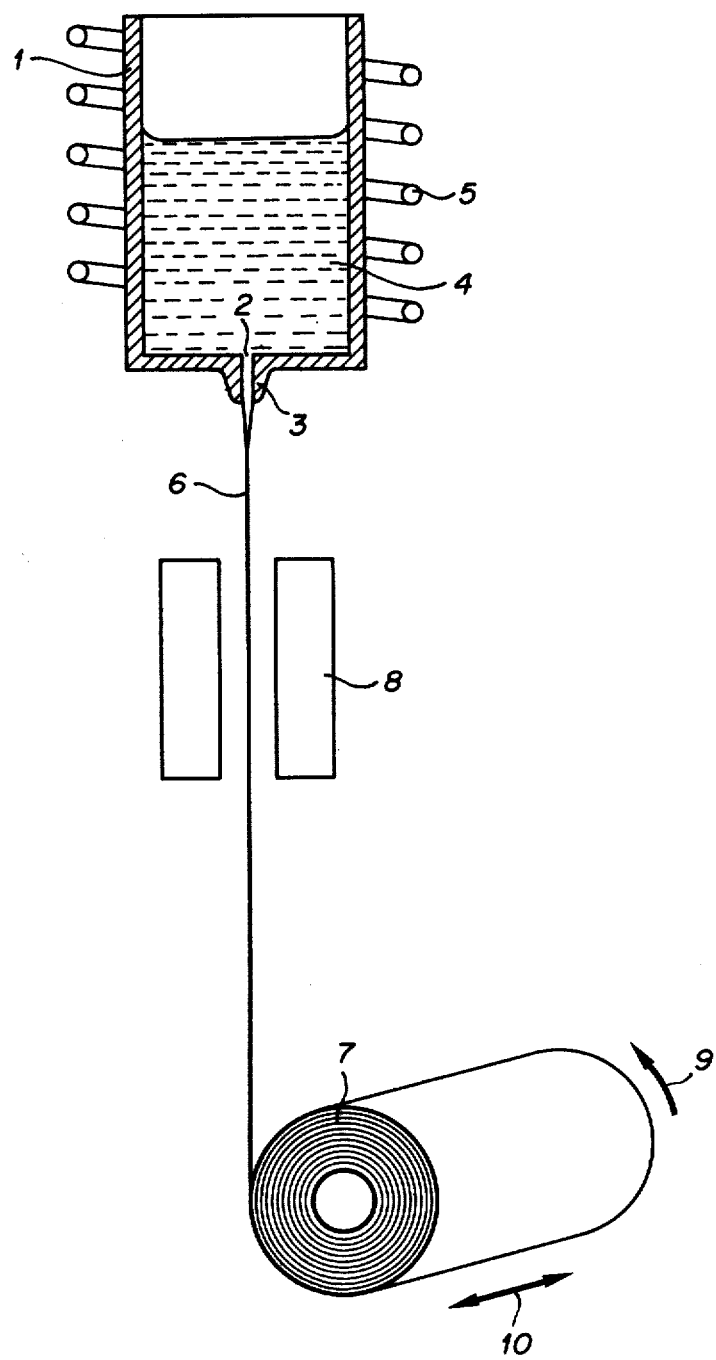

GLASS FIBER OF HIGH MODULUS OF ELASTICITY AND PROCESS FOR MANUFACTURING IT

BACKGROUND OF THE INVENTION

The invention relates to glass fibers and more particularly to glass fibers which may be used in particular as reinforcing elements for various materials or articles, for instance for parts of synthetic organic resins.

Glass fibers which are used for the reinforcement of different materials are already known. These fibers generally have a sufficient tensile strength (for instance of the order of 250 kg/mm$^2$) for the applications for which they are intended, but the values of their modulus of elasticity are too low. The result is that it is not possible to impart sufficient rigidity to the materials which are reinforced with these fibers. A process which makes it possible to obtain in the laboratory glass fibers having a high modulus of elasticity (Young's modulus) of more than 14,000 kg/mm$^2$ has already been described in J. R. Hutchins and R. V. Harrington, "Glass" Encyclopedia of Chemical Technology, Vol. 10, p. 533 (1966), but the use of this process on an industrial scale does not appear possible in the present state of the art.

So-called "ceramic glass" materials are also known which consist either of a material comprising simultaneously at least one vitreous phase and at least one crystalline phase, or of a material which comprises solely one or more crystalline phases which have a modulus of elasticity higher than that of ordinary glass (material containing only a single vitreous phase). However, fibers produced by the known processes (processes consisting in drawing fibers from a mass of molten material) on basis of mixtures corresponding to the known "ceramic glasses" have a tensile strength which is less than that of ordinary glass fibers.

SUMMARY OF THE INVENTION

A principal object of the present invention is specifically to provide a glass fiber which has both a high modulus of elasticity, of a value, for instance, at least equal to 8,000 kg/mm$^2$, and a tensile strength at least as high as that of the known glass fibers, for instance at least 250 kg/mm$^2$.

For this purpose the glass fiber in accordance with the invention is formed of a vitreous matrix containing a plurality of inclusions which are dispersed in the matrix, at least a part of these inclusions being at least in part in a crystalline state. These inclusions may be of any form, and in particular spherical, ellipsoidal or acicular, and they may be either dispersed uniformly in the matrix or arranged in accordance with a special spatial configuration, and particularly in the form of strings whose axis is substantially parallel to the axis of the fiber.

It appears that on the one hand an ellipsoidal or even an acicular form of the inclusions, combined with the major axis of the ellipsoid or the axis of the needles arranged parallel to the axis of the fiber, and on the other hand a string configuration with axis parallel to that of the fiber are particularly favorable for the obtaining of a high modulus of elasticity.

The diameter of the fiber is preferably of the order of 10 to 20 microns and the maximum size of the inclusions is at most equal to 1000 angstroms. The ratio of the volume of the crystalline phases to the volume of the vitreous phase (or phases) should preferably be at least equal to 30%, without, however, exceeding about 60%.

Another object of the invention is a process for manufacturing the glass fiber described above. This process is characterized by:

forming a mixture of inorganic compounds in proportions corresponding to the composition of a glass having, above a temperature $T_d$ which is contained within the temperature range in which the viscosity of the glass has a value suitable for the drawing of fibers, a range of existence of a single vitreous phase which is decomposable, by cooling below $T_d$, into two vitreous phases, this decomposition manifesting itself by the formation of vitreous inclusions dispersed in a vitreous matrix, the composition of this glass being selected from a system comprising at least a range of existence of a crystalline phase capable of being formed in said vitreous inclusions by heating within the temperature range below $T_d$, melting said mixture and then bringing to a temperature above $T_d$ and maintaining it at such temperature at least for a period of time sufficient to obtain its homogenization, and then maintaining it at a value, still above $T_d$, which corresponds to a viscosity appropriate for the drawing of fibers, continuously drawing at least one fiber from the homogeneous mass thus obtained, while regulating the temperature of this mass and the speed of drawing of the fiber in such a manner that, the mass remaining at a temperature above $T_d$, the temperature of the fiber is equal to $T_d$ in the vicinity of the portion of the fiber where it originates from the mass, passing the resultant fiber into a first zone in which it is maintained, for a period of time sufficient to cause the formation of vitreous inclusions therein, at a temperature below $T_d$ but sufficient in order for the value of its viscosity to be suitable for a phase separation in vitreous state, thereupon passing the fiber into a second zone in which its temperature assumes, by cooling, over its entire cross section, a value close to room temperature, and then into a third zone in which the fiber is heated, in a portion of its thickness starting from its surface, to a value less than $T_d$ but sufficient to cause the crystallization of the said crystalline phase, and maintaining the fiber in said third zone for a period of time sufficient to obtain a desired degree of crystallization, finally passing the fiber into a fourth zone in which its temperature resumes room temperature.

According to this process, a mixture is prepared of inorganic compounds corresponding to a glass capable of forming a vitreous phase which is decomposable, by cooling, into at least two vitreous phases, at least a portion of the range of existence of the initial vitreous phase being included within a temperature range which also includes the temperature of decomposition of said phase, within which the viscosity of the glass has a value suitable for the drawing of fibers, the composition of this glass being selected from a system comprising at least a crystalline-phsae range of existence having a Young's modulus at least equal to that which it is desired to obtain for the fiber whose limits of composition are included within or close to those of the vitreous phase or phases forming the said inclusions, the crystallization of this crystalline phase being capable of occurring spontaneously at a temperature at most equal to the temperature of decomposition of the initial vitreous phase, this mixture is homogenized, brought to a temperature above the decomposition temperature of the initial vitreous phase and contained within the range suitable for the drawing of fiber, least one fiber is drawn from the homogeneous mass, said fiber being brought, in the part thereof where it separates from the mass, to a temperature at most equal to the decomposition temperature of the vitreous phase, while maintaining the rest of the glass above said last-mentioned temperature.

Thus, upon the drawing of the fiber, inclusions of at least one other phase dispersed within a continuous phase are formed as a result of the decomposition of the initial vitreous phase. The proportion by volume of the dispersed phase with respect to the continuous phase develops as the decomposition of the initial phase increases, between an original value of zero (initial phase not decomposed) and a maximum which depends on the composition of the glass used and the operating conditions.

The inclusions appear in the form of a vitreous phase originally. However, concurrently with the formation of these inclusions, a spontaneous crystallization takes place within this vitreous phase so that at least a part of the inclusions is in crystalline state in the fiber which is finally obtained.

The speed of drawing seems to play an important role in determining the shape and spatial configuration of the inclusions. A high speed of drawing, all other things being equal, appears to favor the string alignment of the inclusions and their formation in ellipsoidal or acicular shape.

The physical properties of the fiber obtained by the process in accordance with the invention, and particularly its modulus of elasticity, are better the higher the proportion by volume of the crystalline portions of the inclusions as compared with the vitreous portions of these same inclusions.

This is why it is advisable, in order to obtain as complete a crystallization as possible, to maintain the fiber at a temperature equal or close to that which corresponds to the maximum rate of crystallization for a period of time sufficient to obtain the desired degree of crystallization.

For this purpose, the fiber, as it is drawn, can be passed into a zone maintained at a temperature which is favorable for the crystallization, the length of this zone being selected as a function of the speed of drawing of the fiber.

The process in accordance with the invention can be placed into practice with the use of known techniques for the forming of the fiber. For example, the entire molten mixture can be placed in a receptacle provided with heating means which make it possible to maintain this mixture molten at an adjustable temperature so as to impart to it a viscosity which is suitable for the formation of fibers, this receptacle being also provided with at least one orifice of a diameter corresponding to that of the fiber which it is desired to obtain. For example, there can be employed for this purpose a crucible of refractory material which is inert with respect to the molten mixture, for instance a crucible of platinum-rhodium alloy, the bottom of which has an outlet orifice with a diameter of the order of 1 to 2 mm in diameter. The mixture can also be formed from its components, melted and homogenized in the crucible itself. (In this case, the homogenization is obtained by simply maintaining it in liquid state for a sufficient period of time.) As means of heating, any suitable means can be employed, for instance an induction or resistance heating device applied directly to the crucible or forming part of a furnace into which the crucible is introduced. The discharge orifice can be provided with a closure device making it possible to start the discharge at the moment when the mass of molten glass has reached a temperature which corresponds to a viscosity suitable for its spinning and, if necessary, to interrupt the discharge.

The mixture can also be prepared and homogenized by one or more fusions, possibly crushing the mass after cooling to solid state, between two successive melting operations, prior to its introduction into the receptacle which serves for the preparation of the fiber.

Upon its emergence from this receptacle through the discharge orifice, the glass which originally forms a droplet which solidifies in the form of a small ball on the outside of the receptacle can be stretched into a fiber on a rotary cylindrical drum having, for instance, a diameter of about 30 to 35 centimeters and a length of 10 to 30 cm which makes it possible, by rotation of this drum, to pull a fiber at a suitable speed, this fiber winding up on this drum. This speed can be adjusted, for instance, to a value of between 10 to 60 meters/second.

Between the discharge receptacle and the fiber-winding drum, the fiber can be passed into a zone having a temperature corresponding to a high speed of crystallization, which zone can, for instance, be obtained by means of a tubular electric furnace.

The temperature necessary in order to melt the ingredients of the mixture in order to homogenize them is, for instance, between 1400° and 1600°C. The temperature at which the mass of molten glass is maintained in the discharge crucible is, for instance, between 1200° and 1500°C.

In order to obtain a large proportion of crystals, the following parameters are adjected: length and temperature of the crystallization furnace; speed of spinning; temperature of the mixture at the entrance of the fiber into the crystallization furnace; temperature of the molten mass; distance between the discharge orifice and the entrance of the crystallization furnace.

BRIEF DESCRIPTION OF THE DRAWING

The accompanying drawing shows schematically by way of example a device which can be used to manufacture the fiber in accordance with the invention.

The sole FIGURE of the drawing is a partial section through the device.

DESCRIPTION OF THE PREFERRED EMBODIMENTS

A metal crucible 1, the bottom of which is provided with an orifice 2 pierced through a nozzle 3 of suitable shape, contains a mixture 4 of inorganic compounds corresponding to a glass. An induction heating device whose winding 5 surrounds the crucible 1 makes it possible to maintain the temperature of the mixture 4 at a value of, for instance, between 1200° and 1500°C., which temperature may be regulated precisely so as to impart to the viscosity of this mixture a value suitable for its spinning.

A glass fiber 6 is spun continuously by means of the rotary cylindrical drum 7 on which it is wound, the drum 7 being imparted, in addition to its rotational movement, in the direction indicated by the curved arrow 9, also a movement of linear oscillation in the direction of its axis, indicated by the linear arrow 10.

The fiber 6 passes through the electric furnace 8 which makes it possible to maintain it at a temperature favorable for crystallization during its passage through this furnace.

The furnace 8 may, for instance, be of a length of between 10 and 100 cm. The distance between the lower end of the nozzle 3 and the entrance of the fiber 6 into the furnace 8 can, for instance, be between 0 and 50 cm.

The temperature of the furnace 8 may be between 700° and 1500°C permanently at the time of the stretching of the thread. However, this temperature is preferably adjusted to a value of the order of 850°C, which is slightly below the softening point of the fiber.

As a matter of fact, in the mixtures which can be used for the carrying out of the invention, the optimum temperature of crystallization of the crystalline phase is generally above 900°C. However, above a certain temperature the precise value of which depends on the composition of the mixture and which is known as the softening temperature, the viscosity becomes excessively low and the fiber has a tendency to break. The value of the softening temperature is generally about 850°C. Therefore, although an increase in temperature above the softening point generally results in an increase in the speed of crystallization, it must be avoided, since it would lead to the breaking of the fiber.

The diameter of the drum 7 is, for instance, of the order of 30 to 35 cm, its speed of rotation being, for instance, of the order of 1200 to 3600 rpm. Thus the speed of drawing of the fiber 6 is, for instance, between 20 and 60 meters per second. The amplitude of linear oscillation of the drum can, for instance, be of the order of 10 to 30 cm.

The overall composition of the mixture is preferably selected in such a manner that the phase separation commences upon the cooling of the homogenous vitreous mass at a temperature at which the viscosity of the mixture has a value suitable for the drawing of fibers, that is to say, a value of the order of $10^3$ to $10^5$ poises.

With regard to the speed of crystallization, it depends in particular on the difference between the concentration of the vitreous phase of the inclusions and the limit concentrations of the range of existence of the crystalline phase at the temperature at which this crystallization is effected. The smaller this difference is and, a fortiori, if the concentration of the inclusions is within the limits of the range of existence of the crystalline phase, the higher the speed of crystallization will be.

In general, for the overall compositions of mixtures which are suitable for the carrying out of the invention, the temperature at which the speed of crystallization is maximum does not coincide with that which corresponds to the maximum value of the speed of formation of the inclusions. Generally, the first of these temperatures is higher than the second.

Therefore, it may be advisable, in order to favor the formation of the inclusions, to allow the fiber to cool over a certain length upon its emergence from the pasty mass so as to obtain as complete a phase separation as possible, without, however, allowing the fiber to drop to a temperature at which it assumes a solid consistency and then reheating the fiber to a temperature corresponding to a high speed of crystallization.

In the event that the composition of the glass is such that the speed of crystallization cannot reach a sufficient value, only the inclusions located in the vicinity of the periphery of the fiber contain a substantial proportion of crystallized portion. Those which are on the inside of the fiber remain entirely in amorphous state. The central portion of the fiber is therefore formed on an opalescent polyphase glass composed of at least two vitreous phases of different compositions and only the peripheral portion is formed of a "ceramic glass" formed of at least one vitreous phase and at least one crystalline phase. Such a fiber is distinguished from a homogeneous glass fiber entirely in vitreous state by a high value of its modulus of flexure than by a high modulus of elasticity.

On the other hand, for a glass having a composition such that the speed of crystallization is high, for instance a speed of the order of 2 microns per second, all the inclusions contain a large proportion of crystalline portions corresponding, for instance, to an overall percentage of the order of 40 to 50% by volume for the entire fiber, and a fiber having a modulus of elasticity which may be as high as 14,000 kg/mm$^2$ can be obtained.

A glass which is particularly suitable for the carrying out of the invention can be obtained from a mixture whose composition, expressed in weight percentage, is within the following limits:

| | |
|---|---|
| $SiO_2$ | 40 to 55 |
| $Al_2O_3$ | 5 to 15 |
| $B_2O_3$ | 5 to 12 |
| $CaO + CaF_2$ | 8 to 30 |
| $CaO$ | 8 to 30 |
| $CaF_2$ | 0 to 20 |
| $Na_2CO_3 + NaF$ | 0 to 15 |
| $NaF$ | 0 to 15 |
| $Na_2CO_3$ | 0 to 15 |
| $TiO_2$ | 0 to 10 |
| $P_2O_5$ | 0 to 7 |
| $Fe_2O_3$ | 0 to 20 |
| $MgO$ | 0 to 5 |

EXAMPLE 1

A glass is prepared from a mixture of inorganic compounds having the following composition (expressed in weight percent):

| | |
|---|---|
| $SiO_2$ | 46.6 |
| $Al_2O_3$ | 12.1 |
| $B_2O_3$ | 8.6 |
| $CaO$ | 15.1 |
| $Na_2CO_3$ | 4.3 |
| $TiO_2$ | 7.6 |
| $P_2O_5$ | 5.5 |

For this purpose, a glass having a molar composition 5 $TiO_2$/2 $P_2O_5$ is first of all prepared in the following manner: a mixture of oxides corresponding to this composition is melted in a platinum crucible and this mixture is maintained in molten state at 1450°C for 2 hours. This mixture is solidified by quenching with water and reduced to a powder having a particle size of about 100 microns.

A suitable proportion of the powder thus obtained is used for the preparation of the glass containing the entire ingredients indicated above. These ingredients are mixed in powder state and melted together by heating at about 1500°C.

By means of the apparatus and proceeding in the manner described above, a fiber is formed under the following conditions:

Temperature of the molten mass during the drawing: 1310°C.

Distance between the orifice of the crucible and the entrance of the crystallization furnace: 10 cm.

Length of the crystallization furnace: 30 cm.

Average temperature of the surface of the fiber in the crystallization furnace: 1400°C.

Speed of drawing: 30 m/sec.

One thus obtains a fiber of a diameter of 15 microns formed of a vitreous matrix containing filiform inclusions parallel to the axis of the fiber, these inclusions having an average diameter of about 1000 angstroms and themselves containing other filiform inclusions having an average diameter of about 250 angstroms.

In the central portion of the fiber, these two types of inclusions are formed practically solely by vitreous phases of compositions different from that of the matrix. On the other hand, in the vicinity of the periphery of the fiber, the inclusions having the diameter of the order of 250 angstroms are formed of a crystallized solid solution formed of calcium silicate and calcium phosphate. The overall proportion of crystals in the fiber is about 5% by volume.

The improvement in the physical properties of the fiber thus obtained as compared with those of an ordinary glass fiber relates particularly to the value of its modulus of elasticity.

EXAMPLE 2

The same procedure is used as in Example 1, but starting from a mixture of inorganic compounds having the following composition (expressed in weight percent):

| | |
|---|---|
| $SiO_2$ | 45.4 |
| $Al_2O_3$ | 10.9 |
| $B_2O_3$ | 6.1 |
| $CaO$ | 13.1 |
| $Na_2CO_3$ | 13.2 |
| $TiO_2$ | 6.6 |
| $P_2O_5$ | 4.7 |

In this way there is obtained a fiber of a diameter of 20 microns formed of a vitreous matrix containing a plurality of filiform inclusions of an average diameter of 0.1 micron composed of a crystalline phase having the composition and the crystalline structure of the mineral species known as "devitrite" ($Na_2O$, 3 $CaO$, 6 $SiO_2$) enclosed in a vitreous phase of a composition different from that of the matrix. This crystalline phase is in the form of crystals having dimensions of the orde of 200 to 500 angstroms. The overall proportion of crystals in the fiber is about 40% by volume.

EXAMPLE 3

The same procedure is used as in Example 1, but starting from a mixture of inorganic compounds having the following composition (expressed in weight percent):

| | |
|---|---|
| $SiO_2$ | 49.8 |
| $Al_2O_3$ | 11.5 |
| $B_2O_3$ | 8.0 |

| | -Continued |
|---|---|
| $CaO$ | 13.4 |
| $Na_2CO_3$ | 4.2 |
| $Fe_2O_3$ | 13.1 |

A fiber is obtained of a diameter of 10 microns formed of a vitreous matrix containing a plurality of filiform inclusions of an average diameter of 0.1 micron, composed entirely of crystallized calcium ferrite $Ca_2Fe_2O_5$.

The overall proportion of crystals in the fiber is about 50% by volume.

EXAMPLE 4

The same procedure is used as in Example 1, but starting from a mixture of inorganic compounds having the following composition (expressed in weight percent):

| | |
|---|---|
| $SiO_2$ | 49.1 |
| $Al_2O_3$ | 5.8 |
| $B_2O_3$ | 8.1 |
| $CaO$ | 9.3 |
| $CaF_2$ | 18.6 |
| $Na_2CO_3$ | 3.9 |
| $Fe_2O_3$ | 5.2 |

A fiber is obtained which has a diameter of 20 microns, formed of a vitreous matrix in which there are embedded filiform inclusions of an average diameter of 0.1 micron composed of a mixture of calcium ferrite $Ca_2Fe_2O_5$ crystals and crystals of the compound of the formula $(CaFe)_5Si_6O_{17}$, 5 F (compound having a crystalline structure similar to that of the crystalline species known as "tobermorite").

The overall proportion of crystals in the fiber is about 50% by volume.

The values of the tensile strength and modulus of elasticity of the fibers obtained by proceeding in the manner described in the above examples are given in the following table:

| Example No. | Tensile strength ($kg/mm^2$) | Modulus of elasticity ($kg/mm^2$) |
|---|---|---|
| 1 | 262 | 10,700 |
| 2 | 200 | 9,850 |
| 3 | 250 | 12,100 |
| 4 | 180 | 11,500 |

It is to be noted that the measurements of the tensile strength and of the modulus of elasticity the results of which are indicated in the above table were carried out while taking the customary precautions for the protection of the surface of the fibers, that is to say, by effecting these measurements on fibers whose surface had been provided upon their stretching, and in particular before winding them on a drum, with a suitable protective covering, for instance by subjecting these fibers to a vapor treatment with an aqueous suspension of starch in the manner known per se.

It is to be noted that U.S. Pat. Nos. 3,413,133 and 3,498,805 describe the manufacture of an opalescent glass fiber formed of a vitreous matrix containing globules of another phase in dispersion. This latter phase is also vitreous, but it can contain crystals which are either dispersed within the globules or localized in the vicinity of the surfaces of separation between these globules and the matrix. This glass fiber therefore has a structure similar to that of the fiber obtained by the process in accordance with the present invention; however, it differs from the latter by the fact that the said globules are entirely in vitreous state or contain only a very small proportion of crystals.

The process of manufacture described in these patents consists simply in drawing a fiber from a molten mass of glass in which there takes place the decomposition of a vitreous phase initially in homogenous state into two vitreous phases which are not miscible with each other, this drawing being effected during the short transitory period during which the phase in course of formation is in the state of small droplets dispersed within the other phase.

This process therefore has the drawback of entailing limits of the period propitious to the stretching of the fibers which limits, in accordance with the information given in U.S. Pat. No. 3,498,805 itself, are, for instance, on the one hand the precise moment when the melting point of the glass is reached and on the other hand 4 minutes after this moment. Contrary to the process in accordance with the present invention, this process therefore does not lend itself to the obtaining of a fiber of unlimited length by continuous drawing. Furthermore, it would not appear easy, when using this process to obtain a precise and permanently constant adjustment of the respective proportion of the phases which form the fiber, or of the shape and dimensions of the globules dispersed in the matrix. The process in accordance with the present invention therefore presents an obvious advance in the art over the process described in the two aforementioned U.S. patents.

We claim:

1. Process of manufacturing a glass fiber comprising:

forming a mixture of inorganic compounds in proportions corresponding to the composition of a glass having, above a temperature $T_d$ which is included within the range of temperatures within which the viscosity of the glass has a value suitable for the drawing of fibers, a range of existence of a single vitreous phase which is decomposable, by cooling below $T_d$, into two vitreous phases, said decomposition manifesting itself by the formation of vitreous inclusions dispersed in a vitreous matrix, the composition of said glass being selected from a system comprising at least one range of existence of a crystalline phase capable of forming in said vitreous inclusions by heating within the temperature range below $T_d$, melting said mixture and then bringing it to a temperature above $T_d$ and maintaining it at such a temperature at least for a time sufficient to obtain its homogenization, then maintaining it at a value, still greater than $T_d$, corresponding to that at which the viscosity is suitable for the drawing of fibers, continuously stretching at least one fiber from the homogeneous mass thus obtained, regulating the temperature of this mass and the speed of drawing of the fiber in such a manner that the mass remains at a temperature above $T_d$ and the temperature of the fiber is equal to $T_d$ in the vicinity of the portion of the fiber where it originates from the mass, passing the fiber thus produced into a first zone in which it is maintained, for a period of time sufficient to cause the formation of vitreous inclusions therein, at a temperature below $T_d$ but sufficient for the value of its viscosity to be suitable for a separation of phases in vitreous state, then passing the fiber into a second zone in which its temperature assumes, by cooling over its entire cross section, a value close to room temperature, then passing the fiber into a third zone in which the fiber is heated, in a portion of its thickness from its surface, to a value less than $T_d$ but sufficient to cause the crystallization of the said crystalline phase, and maintaining the fiber in said third zone for a period of time sufficient to obtain a desired degree of crystallization, and finally passing the fiber into a fourth zone in which its temperature resumes the value of room temperature.

2. Glass fiber obtained by the process according to claim 1.

* * * * *